(12) United States Patent
Jeong et al.

(10) Patent No.: US 10,620,774 B2
(45) Date of Patent: Apr. 14, 2020

(54) METHOD AND APPARATUS FOR PROVIDING MULTIPLE APPLICATIONS

(71) Applicant: Samsung Electronics Co., Ltd., Suwon-si, Gyeonggi-do (KR)

(72) Inventors: Hyesoon Jeong, Chilgok-gun (KR); Jaewon Jeon, Daegu (KR); Daesik Hwang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/785,819

(22) Filed: Oct. 17, 2017

(65) Prior Publication Data

US 2018/0039382 A1 Feb. 8, 2018

Related U.S. Application Data

(63) Continuation of application No. 14/472,944, filed on Aug. 29, 2014, now Pat. No. 9,857,935.

(30) Foreign Application Priority Data

Sep. 2, 2013 (KR) ........................ 10-2013-0105093

(51) Int. Cl.
| | |
|---|---|
| *G06F 3/048* | (2013.01) |
| *G06F 3/0481* | (2013.01) |
| *G06F 9/451* | (2018.01) |
| *G06F 3/0488* | (2013.01) |

(52) U.S. Cl.
CPC .......... *G06F 3/0481* (2013.01); *G06F 3/0488* (2013.01); *G06F 9/451* (2018.02); *G06F 3/04886* (2013.01); *G06F 2203/04803* (2013.01)

(58) Field of Classification Search
CPC ......... G06F 3/0481–0482; G06F 9/451; G06F 2203/04803
See application file for complete search history.

(56) References Cited

U.S. PATENT DOCUMENTS

| | | | |
|---|---|---|---|
| 5,815,151 | A | 9/1998 | Argiolas |
| 6,862,712 | B1 | 3/2005 | Nakagawa et al. |
| 7,370,284 | B2 | 5/2008 | Andrea et al. |
| 8,547,347 | B2 | 10/2013 | Chiang et al. |

(Continued)

FOREIGN PATENT DOCUMENTS

| | | |
|---|---|---|
| CN | 101354628 A | 1/2009 |
| CN | 101686280 A | 3/2010 |

(Continued)

OTHER PUBLICATIONS

European Office Action dated Mar. 13, 2018, issued in European Application No. 14 840 733.1-1221.

(Continued)

*Primary Examiner* — Claudia Dragoescu
(74) *Attorney, Agent, or Firm* — Jefferson IP Law, LLP

(57) ABSTRACT

A method and an apparatus for providing a plurality of applications are provided. The method includes determining at least a partial area of a User Interface (UI) corresponding to an input, generating a window based on the at least theartial area, displaying an application list related to the window, and based on an input of selecting one application from the application list, providing the selected application through the window.

18 Claims, 8 Drawing Sheets

(56) References Cited

U.S. PATENT DOCUMENTS

| | | | |
|---|---|---|---|
| 9,710,125 B2 | 7/2017 | Chiang et al. | |
| 2007/0180400 A1* | 8/2007 | Zotov | G06F 3/04883 |
| | | | 715/788 |
| 2009/0031248 A1 | 1/2009 | Kano et al. | |
| 2009/0228820 A1* | 9/2009 | Kim | G06F 3/04817 |
| | | | 715/769 |
| 2009/0235196 A1* | 9/2009 | MacBeth | G06Q 10/107 |
| | | | 715/780 |
| 2009/0298545 A1 | 12/2009 | Kittel et al. | |
| 2010/0079392 A1 | 4/2010 | Chiang et al. | |
| 2010/0081475 A1* | 4/2010 | Chiang | G06F 3/0483 |
| | | | 455/564 |
| 2010/0088634 A1 | 4/2010 | Tsuruta et al. | |
| 2011/0175930 A1 | 7/2011 | Hwang et al. | |
| 2012/0011467 A1 | 1/2012 | Sung | |
| 2012/0084717 A1 | 4/2012 | Yao et al. | |
| 2012/0154447 A1 | 6/2012 | Kim et al. | |
| 2012/0246586 A1 | 9/2012 | Heo et al. | |
| 2013/0167068 A1 | 6/2013 | Sim | |
| 2014/0089833 A1 | 3/2014 | Hwang et al. | |
| 2014/0096050 A1* | 4/2014 | Boblett | G06F 3/017 |
| | | | 715/769 |

FOREIGN PATENT DOCUMENTS

| | | |
|---|---|---|
| CN | 102109944 A | 6/2011 |
| CN | 102129345 A | 7/2011 |
| CN | 102201221 A | 9/2011 |
| CN | 102591575 A | 7/2012 |
| EP | 2 503 440 A2 | 9/2012 |
| KR | 10-2011-0050248 A | 5/2011 |
| KR | 10-1813028 A | 6/2012 |
| KR | 10-2013-0045744 A | 5/2013 |
| KR | 10-2014-0039575 A | 4/2014 |
| WO | 2013/073898 A1 | 5/2013 |

OTHER PUBLICATIONS

Chinese Office Action dated Jan. 24, 2019; Application No. 201480048438.5.

Chinese Office Action dated Jul. 3, 2019, issued in Chinese Application No. 201480048438.5.

Chinese Decision of Rejection dated Jan. 10, 2020, issued in counterpart Chinese Application No. 201480048438.5.

* cited by examiner

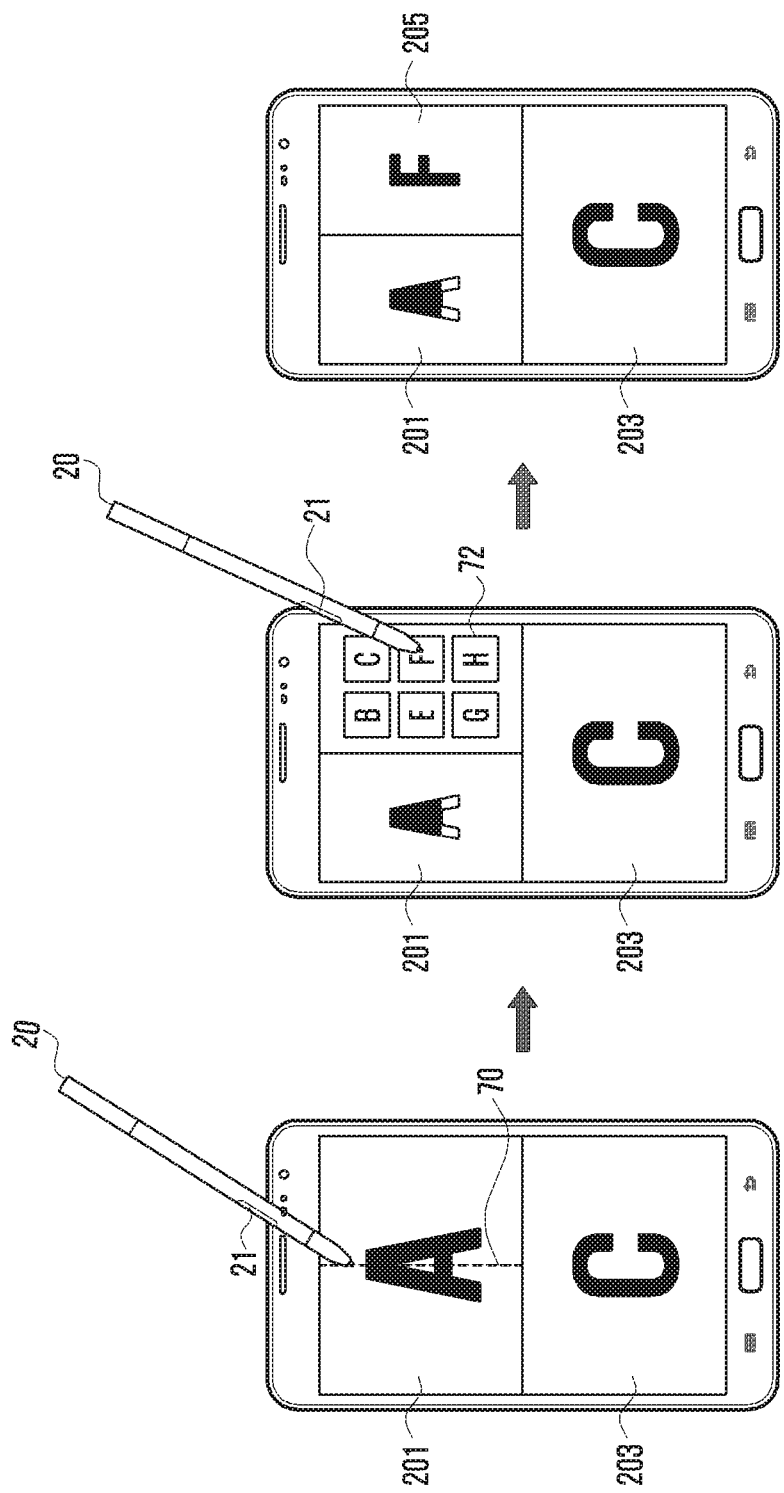

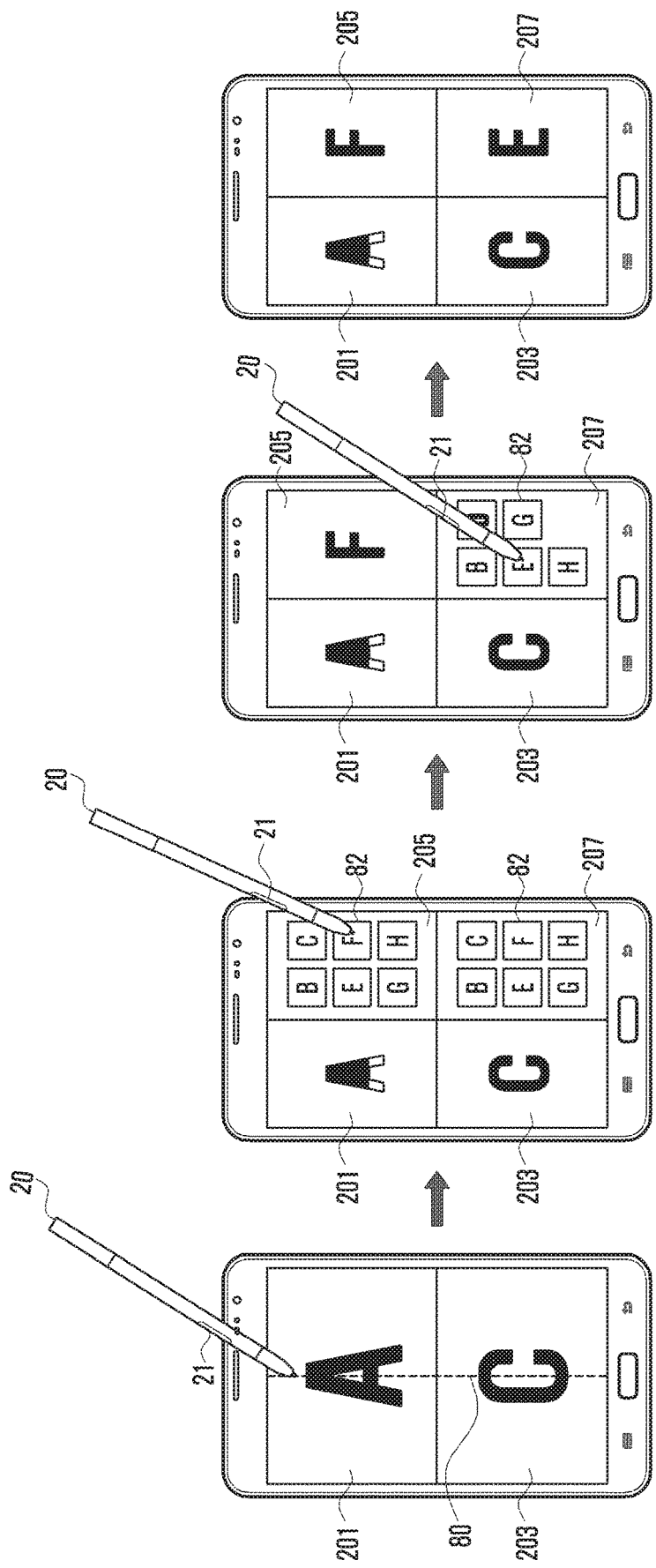

METHOD AND APPARATUS FOR PROVIDING MULTIPLE APPLICATIONS

CROSS-REFERENCE TO RELATED APPLICATION(S)

This application is a continuation application of prior application Ser. No. 14/472,944, filed on Aug. 29, 2014, which claimed the benefit under 35 U.S.C. § 119(a) of a Korean patent application filed on Sep. 2, 2013 in the Korean Intellectual Property Office and assigned Serial number 10-2013-0105093, the entire disclosure of which is hereby incorporated by reference.

TECHNICAL FIELD

The present disclosure relates to a method and an apparatus for configuring a multi-window based on an input and simultaneously providing various applications in an electronic device.

BACKGROUND

An electronic device may be configured to provide various applications. For example, the various applications may include an application for exchanging a message through a network, an application for obtaining an image through a camera, an application for providing voice communication, an application for reproducing a video, an application for receiving a broadcasting signal and providing a video or audio program, and the like.

Further, the electronic device may be implemented in various types. Various types of electronic devices include a stationary electronic device such as a TeleVision (TV) having a large display, a portable electronic device such as a smart phone having a portable size, a wearable electronic device such as a watch, glasses, clothes, or a belt which can be worn on a user's body, and the like.

The electronic devices include an electronic device which simultaneously provides a plurality of applications through a plurality of windows (for example, a multi-window) according to a user's request for simultaneous reception of various applications.

Recently, electronic devices may configure a plurality of applications in a multi-window type, so as to provide convenience to users. However, a configuration of the multi-window type is fixed to a predetermined form. Particularly, a fixed multi-window for executing a plurality of applications calls and uses a multi-window bar for user convenience. The multi-window bar is disposed in a predetermined area of a display and has a button unit for calling the multi-window. As a result, the multi-window implementing a plurality of applications having the multi-window bar and the button makes the configuration for various execution screens complex. For example, a layout of a window is configured while an application which a user desires to execute is selected from various applications and is executed by a tap action or a drag & drop action. The window may be switched to a pop-up window through an additional menu of an application being executed on an entire screen or another function is performed on a pop-up window by an additional call related to the application while the application is executed. Accordingly, such a method has a limitation and deteriorates the appearance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for generating a multi-window corresponding to inputs, displaying an application list on the generated multi-window, and providing an application selected from the application list on the multi-window.

In accordance with an aspect of the present disclosure, a method is provided. The method includes determining at least a partial area of a User Interface (UI) corresponding to an input, generating a window based on the at least the partial area, displaying an application list related to the window, and based on an input of selecting one application from the application list, providing the selected application through the window.

In accordance with another aspect of the present disclosure, a method is provided. The method includes displaying one or more first windows, generating a second window in a partial area of the one or more first windows based on a user input, displaying an application list through the second window, selecting an application from the application list, and providing the selected application through the second window.

In accordance with another aspect of the present disclosure, an apparatus is provided. The apparatus includes a display unit configured to display one or more first windows and a second window based on at least a partial area of the one or more first windows, a touch sensor configured to detect an input in the one or more first windows, and a controller configured to control generation of the second window based on the at least the partial area of the one or more first windows corresponding to the input, controlling a display of an application list through the second window, and a control to display an application selected from the application list on the second window.

In accordance with another aspect of the present disclosure, a non-transitory computer-readable recording medium recording a program for executing a method is provided. The method includes determining at least a partial area of a UI corresponding to an input, generating a window based on the at least the partial area, displaying an application list related to the window, and, based on an input of selecting at least one application from the application list, providing the selected application through the window.

A method and an apparatus for providing a plurality of applications according to various embodiments can generate an additional window based on an input, so as to provide a user with an intuitive method of executing a plurality of applications.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, and 6C illustrate examples of re-splitting a screen in a state where the screen is split and displaying a third window according to various embodiments of the present disclosure;

FIGS. 7A, 7B, 7C, and 7D illustrate examples of re-splitting a screen in a state where the screen is split and displaying an additional window according to various embodiments of the present disclosure.

Throughout the drawings, it should be noted that like reference numbers are used to depict the same or similar elements, features, and structures.

DETAILED DESCRIPTION

Figure 1:
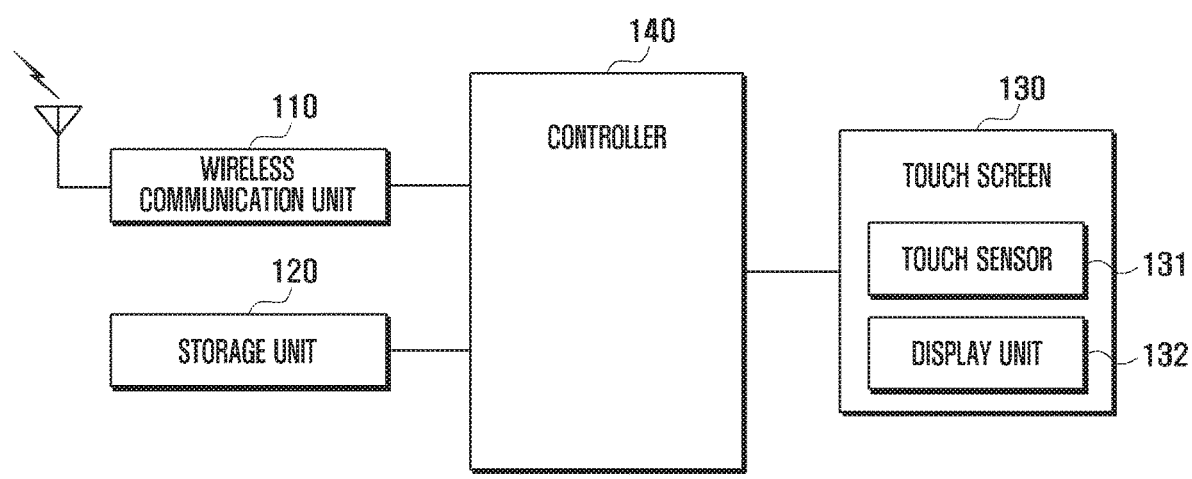
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aforementioned electronic device according to the various embodiments of the present disclosure may include all devices using an Application Processor (AP), a Graphic Processing unit (GPU), and a Central Processing Unit (CPU), such as all information communication devices, all multimedia devices, and all application devices thereof, which support the functions of the present disclosure. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), a digital audio player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to another embodiment, the electronic devices may be smart home appliances adopting a communication function. For example, the smart home appliance may include at least one of a television, a Digital Video Disk (DVD) player, an audio, a refrigerator, an air conditioner, a vacuum cleaner, an oven, a microwave oven, a washing machine, an air cleaner, a set-top box, a TeleVision (TV) box (e.g., Samsung HomeSync™, Apple TV™, or Google TV™), a game console, an electronic dictionary, an electronic key, a camcorder, and an electronic photo frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to an embodiment, an electronic device may include at least one of a part of furniture or a building/structure having a communication function, an electronic board, an electronic signature receiving device, a projector, and various types of measuring instruments (for example, a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

FIG. 1 is a block diagram illustrating a configuration of an electronic device according to various embodiments of the present disclosure.

Referring to FIG. 1, the electronic device may include a wireless communication unit 110, a storage unit 120, a touch screen 130, a controller 140, and other similar and/or suitable components.

The wireless communication unit 110 may perform communication of the electronic device. The wireless communication unit 110 forms a communication channel with a supportable mobile communication network to perform communication, such as voice communication, video communication, data communication and the like. The wireless communication unit 110 may include a radio frequency transmitter for up-converting and amplifying a frequency of a transmitted signal and a radio frequency receiver for low noise-amplifying and down-converting a frequency of a received signal. Further, the wireless communication unit 110 may include a mobile communication module (for example, a 3-generation mobile communication module, a 3.5-generation mobile communication module, a 4-generation mobile communication module or the like). In addition, the wireless communication unit 110 may include a short-range communication module for supporting a short-range communication technology (for example, Bluetooth, Bluetooth Low Energy (BLE), Near Field Communication (NFC), or the like).

The storage unit 120 may store a program and data required for operations of the electronic device and may be divided into a program area and a data area. The program area may store a program controlling general operations of the electronic device, an Operating System (OS) and an application program booting the electronic device and the like. The data area is an area storing data generated according to the use of the electronic device and may store, for example, an image, a dynamic image and the like.

The touch screen 130 is an input/output means for simultaneously performing an input function and a display function, and may include a touch sensor 131 and a display unit 132. Further, when a touch input of an input tool (for example, a finger of the user or an electronic pen) is made by the touch sensor 131 while a particular screen is displayed through the touch unit 132, the touch screen 130 may transmit an input signal according to the touch input to the controller 140. Then, the controller 140 may distinguish touch inputs and control an operation according to the touch input.

According to an embodiment, the touch sensor 131 may detect touch inputs (for example, long press, tap, drag, sweep, flick, multi-touch and the like) of the user of contacting a surface of the touch screen 130. When the touch sensor 131 senses the touch input of the user from the surface of the touch screen 130, the touch sensor 131 may detect a coordinate where the touch input is generated and transmit the detected coordinate to the controller 140. The controller 140 may perform a function corresponding to an area where the touch input is generated, by a signal transmitted from the touch sensor 131. The touch sensor 133 may be configured to convert a change in a pressure applied to a specific portion of the display unit 132 or a change in an electrostatic capacity generated at a specific portion of the display unit 132 into an electric input signal. The touch sensor 131 may be configured to detect a touch pressure according to an applied touch method as well as a touched position and a touched area.

According to any embodiment, the touch sensor 131 may distinguish and detect types of input tools (for example, a user's finger and an electronic pen) performing an input on a window screen (for example, a first window or a multi-window). For example, a touch input by the finger may be identified through recognition of a change in current at a touched position, and an input by the electronic pen (for example, a touch input, a hovering input, or the like) may be identified through detection of an electromagnetic field formed by an electromagnetic induction phenomenon. Further, when a touch input by the electronic pen is generated in a state where a button formed in the electronic pen is pressed, the touch input is distinguished from a touch input through a general electronic pen.

The display unit 132 may display various screens according to the use of the electronic device. For example, a menu, input data, and various pieces of information are visually provided to the user. In any example, the display unit 132 may include a Liquid Crystal Display (LCD), an Organic Light Emitting Diode (OLED), or any other similar and/or suitable display device.

According to an embodiment, the display unit 132 may display a home screen or an application selected by the user on a window screen (for example, a first window or a multi-window). Further, the display unit 132 may display the second window corresponding to a touch input (for example, a finger input by the user or a touch input by the electronic pen) generated by the user in the first window. For example, the second window may be displayed in a pop-up window type or a split window type. For example, the second window may display an application list (for example, an application configured by the user, an application which can be used in a multi-window and the like). The display unit 132 may display (or provide) an application selected by the user from the application list in the second window.

The controller 140 may control operations of the electronic device and a signal flow between internal components of the electronic device (for example, the wireless communication unit 110, the storage unit 120, and the touch screen 130), perform a function of processing data, and control power supplied to the components from a battery.

According to an embodiment, the controller 140 may detect execution of an application according to an input of the user (for example, touch input) and control to display the application in the first window.

According to an embodiment, the controller 140 may change an input mode to a window generation mode. For example, the controller 140 may obtain an input (for example, user input) for executing the window generation mode through the touch sensor 131. When the controller 140 obtains an input of selecting a menu button, the controller 140 may control to display a menu. When the controller 140 detects an input of selecting a window generation mode menu from the displayed menu, the controller 140 may change the input mode to the window generation mode. For example, when the controller 140 obtains the input of selecting the menu button in the window screen (for example, the first window or the multi-window), the controller 140 may control to display the menu. When the controller 140 obtains the input of selecting the window generation mode menu from the display menu, the controller 140 may control to change the input mode for the window generation mode. The controller 140 may change the input mode to the window generation mode according to whether the button 21 of the electronic pen 20 is pressed or whether a generation mode switching menu is selected. Alternatively, when a designated gesture input (for example, an input of drawing a coil) is obtained or an input of drawing a predetermined waveform (for example, a zigzag) is obtained, the controller 140 may change the input mode to the window generation mode. Alternatively, when an input repeatedly moving within a predetermined area is obtained, the electronic device may change the input mode to the window generation mode.

Further, the controller 140 may detect an input (hereinafter, referred to as a "generation request input" for convenience in the description) of the user for generating the second window in a state where the first window is displayed. According to an embodiment, the controller 140 may determine an input generated in a state where the input mode is changed to the window generation mode as the generation request input. For example, when an electronic pen input is obtained in the first window (for example, on the first window) or a neighboring area of the first window (for example, under, over, or around the first window) in a state where the button of the electronic pen is pressed (for example, in the window generation mode), the controller 140 may determine the electronic pen input as the generation request input. In another example, the controller 140 may determine a touch input obtained by the provided User Interface (UI) as the generation request input in a state where the input mode is changed to the window generation mode through the menu button.

In any embodiment, the controller 140 may determine an input obtained on the first window after the input mode is changed to the window generation mode through the menu as the generation request input. For example, the controller may obtain an input of selecting a menu for switching the input mode to the window generation mode and determine an input generated after the switching to the window generation mode as the generation request input.

The controller 140 may recognize a position (or area) corresponding to the generation request input and may control to display the second window based on the corresponding position (or area). According to an embodiment, the controller 140 may obtain an input of drawing a closed curve or an open curve through the touch screen 130 in the window generation mode. The controller 140 may generate and display the second window (for example, pop-up type) inscribed or circumscribed in an area corresponding to the input. Alternatively, the controller 140 may generate and display the second window matching an area corresponding to the closed curve.

According to an embodiment, the controller 140 may detect an input made in the form of line (for example, a curve) of one or more strokes in the window generation mode. The controller 140 may generate and display the second window of an area corresponding to the input (an area corresponding to a rectangle having an upper left coordinate and a lower right coordinate of the line as vertexes facing each other).

According to an embodiment, the controller 140 may obtain an input of crossing at least a part (for example, a part or entirety of the first window) of the touch screen 130 (for example, in a horizontal, vertical, or diagonal direction) in the window generation mode. The controller 140 may generate and display the second window based on the input (for example, generation request input). For example, the controller 140 may split an area corresponding to the first window into a first area and a second area (for example, a horizontal division) based on the input of crossing the first window obtained in the window generation mode, and display the first window in the first area and the second window in the second area. According to an embodiment, the controller 140 may change an application being executed in the first window to be suitable for a size of the first area and display the changed application.

According to an embodiment, when the size of the area corresponding to the input is smaller than a predetermined size (for example, a minimum size which the second window can have (for example, a size larger than ⅕ of the entire screen)), the controller 140 may generate and display the second window having a predetermined size including the area corresponding to the input (for example, the minimum size which the second window can have (for example, a size corresponding to ⅖ of the entire screen)). In any embodiment, when the size of the area corresponding to the input is larger than a predetermined size (for example, a size larger than ⅘ of the entire screen), the controller 140 may generate and display the second window in a predetermined size included in the area corresponding to the input (for example, a maximum size which the second window can have (for example, a size corresponding to ⅗ of the entire screen)).

The controller 140 may display (or provide) an application list related to the second window. For example, the controller 140 may provide an application list which can be executed in the second window. According to an embodiment, the controller 140 may control to display an application list related to the second window in the second window. In the application list related to the second window, an application configured by the user and an application which can be used in the second application may be variously indicated by an icon, a text, a list or the like.

When an input of selecting one application from the application list is obtained, the controller 140 may provide the selected application (for example, second application) to the second window.

The electronic device may have a more or fewer components than those illustrated in FIG. 1. For example, the electronic device according to various embodiments of the present disclosure may include various sensors (for example, an infrared sensor, an illuminance sensor, an image sensor, a proximity sensor and the like) and a broadcast reception module which receives a broadcast signal from an external broadcast management server through a broadcast channel (for example, a satellite broadcast channel, a terrestrial broadcast channel, or the like).

Figure 2B:
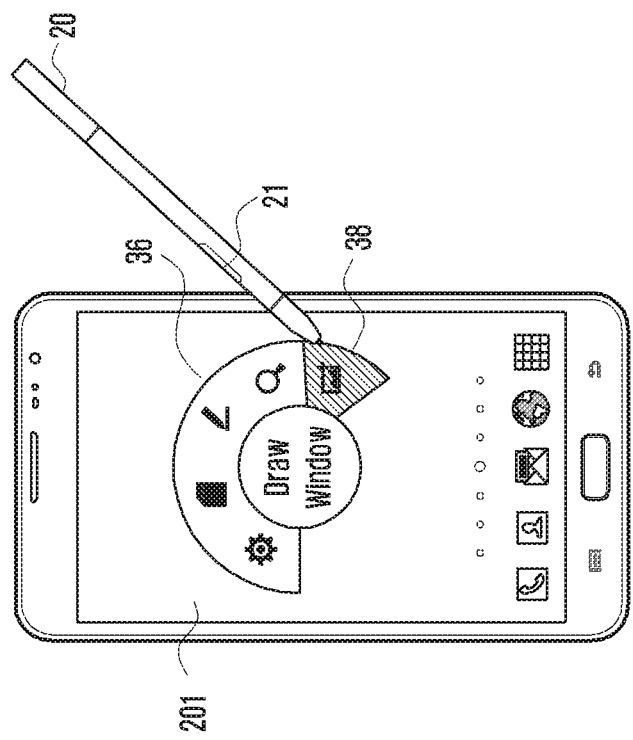
FIGS. 2A and 2B illustrate examples of changing an input mode to a window generation mode according to various embodiments of the present disclosure.
Figure 2A:
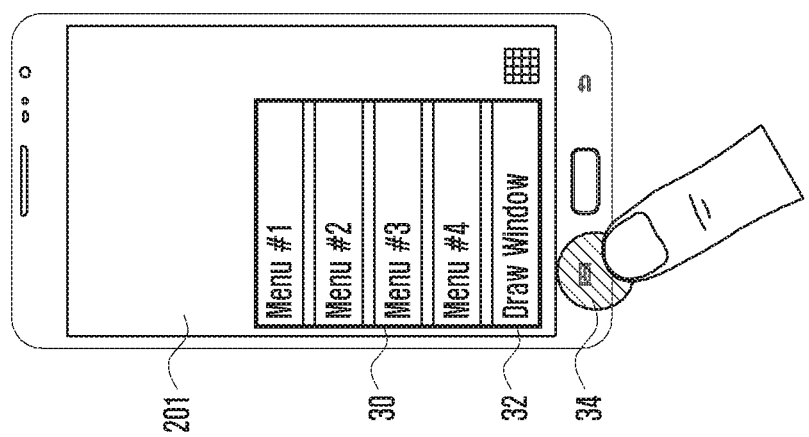

FIGS. 2A and 2B illustrate examples of changing an input mode to a window generation mode according to various embodiments of the present disclosure.

Referring to FIG. 2A, the controller 140 may control to change an input to a window generation mode based on an input. For example, the controller may obtain an input for selecting a menu button 34 of the electronic device, a key button (not shown) of the electronic device, or a menu button (not shown) provided to a first window 201. Based on the input, the controller 140 may generate a menu 30 on the first window 201. The user may select a draw window 32 in the generated menu 30 to generate a window. When the controller 140 detects a touch input of the user input into the draw window 32, the controller 140 may change the input mode to the window generation mode. When the input mode is changed to the window generation mode, the controller 140 may determine the touch input of the user (for example, input by a finger of the user or an electronic pen) as a touch input for generating the window and then operate.

Referring to FIG. 2B, the controller 140 may change the input mode to the window generation mode based on an input of an electronic pen 20. For example, the controller 140 may obtain an input of the electronic pen 20 of touching or hovering on the window (for example, first window or second window). Alternatively, the controller 140 may obtain an input of the electronic pen 20 of controlling a button 21 attached to the electronic pen 20. Alternatively, the controller 140 may obtain a combination of inputs of the electronic pen 20. Alternatively, the controller 140 may generate a menu 36 on the first window 201 based on the input of the electronic pen 20. When the controller 140 detects a user input of selecting the draw window 38, the controller 140 may change the input mode to the window generation mode. When the input mode is changed to the window generation mode, the controller 140 may determine the input (for example, touch input by the user (for example, input by the finger of the user or the electronic pen) as an input for generating the window and then operate.

FIGS. 3A, 3B, 3C, and 3D illustrate examples of displaying a second window according to various embodiments of the present disclosure.

Referring to FIGS. 3A, 3B, 3C, and 3D, in a state in which the input mode is changed to the window generation mode, the controller 140 may detect a touch input of the user in the form of one or more strokes of lines (for example, a curve) on a window screen (for example, first window, multi-window or the like). According to an embodiment, when the input is made in the form of one or more strokes of lines, the controller 140 may generate and display the second window in an area corresponding to a rectangle having two vertexes facing each other in an upper left coordinate and a lower right coordinate of the corresponding line. In any example, the controller 140 may generate the second window based on coordinates of the input lines of one or more strokes. For example, the controller 140 may obtain coordinates of one or more strokes of lines. A length of the line with respect to an x-axis or a y-axis can be calculated using a smallest value and a largest value of coordinates of the x-axis and the y-axis. For example, in a coordinate system indicated by (x, y), the controller 140 may obtain coordinates (2, 6), (3, 7), (4, 7), and (5, 6) of the line. The controller 140 may obtain a length 3 of the line with respect to the x-axis by using a smallest value 2 and a largest value 5 of the x coordinates. Further, the controller 140 may obtain a length 1 of the line with respect to the y-axis by using a smallest value 6 and a largest value 7 of the y coordinates. The controller 140 may generate the second window based on the obtained length of the line with respect to the x-axis or the y-axis. Additionally or alternatively, when the length of the line with respect to the x-axis or the y-axis is smaller than a specified value, the controller 140 may generate the second window by using the specified value.

According to an embodiment, the controller 140 may generate the second window based on coordinates of the input line of one or more strokes corresponding to a horizontal line (e.g., there is no change in a coordinate of the y-axis (for example, an amount of the change in the coordinate of the y-axis=0)) or a vertical line (e.g., there is no change in a coordinate of the x-axis (for example, an amount of the change in the coordinate of the x-axis=0)). For example, the controller 140 may determine a size of the second window (for example, a height) based on the length of the input line of the y-axis when the line corresponds to the vertical line (for example, the amount of the change in the coordinate of the x-axis=0) and determine a size (for example, a width) of the second window based on a predetermined size (for example, a rectangle according to an aspect ratio, a square corresponding to the input line length or the like). Alternatively, the controller 140 may determine a size of the second window (for example, a width) based on the length of the input line of the x-axis when the line corresponds to the horizontal line (for example, the amount of the change in the coordinate of the y-axis=0) and determine a size (for example, a height) of the second window based on a predetermined size (for example, a rectangle according to an aspect ratio, a square corresponding to the input line length or the like).

Figure 3D:
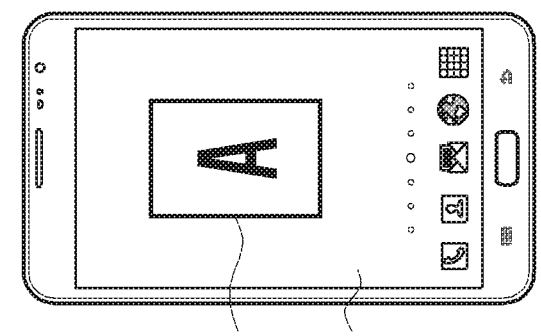
FIGS. 3A, 3B, 3C, and 3D illustrate examples of displaying a second window according to various embodiments of the present disclosure.
Figure 3C:
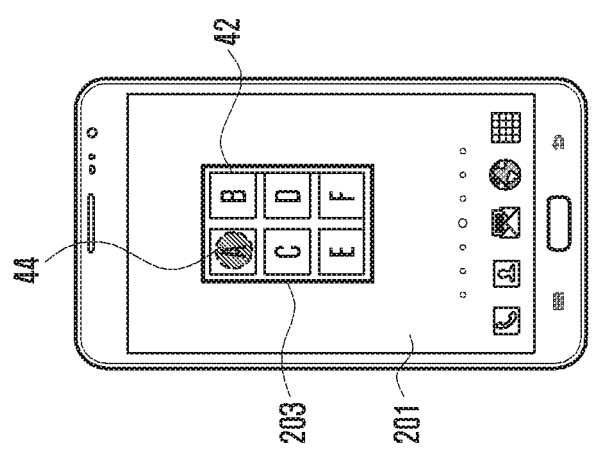
Figure 3B:
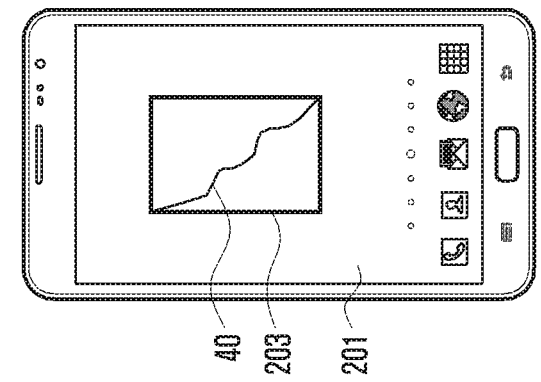
Figure 3A:
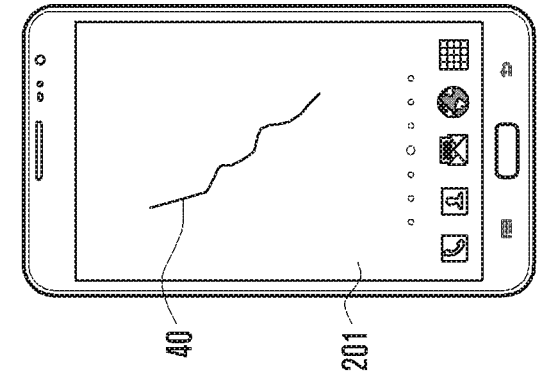

Referring to FIG. 3A, according to an embodiment, the controller 140 may sense a touch input of the user in the form of line 40 of one or more strokes in the first window 201 to generate a window. Referring to FIG. 3B, when the line 40 of one or more strokes is input as the touch input of the user, the controller 140 may generate a second window 203 based on the line 40. For example, the controller 140 may generate the second window 203 having a size corresponding to coordinates of an upper left end and a lower right end (or an upper right end and a lower left end) in the form of popup window. When the second window 203 in the form of popup window is generated, the controller 140 may display an application list 42 on the second window 203 as illustrated in FIG. 3C. The displayed application list may include an application icon configured by the user, an application icon which can be used in the second window and the like. In a state where the application list is displayed on the second window 203, the controller 140 may detect a touch input 44 of the user for executing an application. The user may execute a desired application through the touch input (for example, by a finger or an electronic pen) on the second window 203 displaying the application list. The controller 140 may display an application executed through a user input on the second window 203 as illustrated in FIG. 3D.

FIGS. 4A, 4B, 4C, and 4D illustrate examples of displaying a second window according to various embodiments of the present disclosure.

Figures 4A, 4B, 4C, 4D:
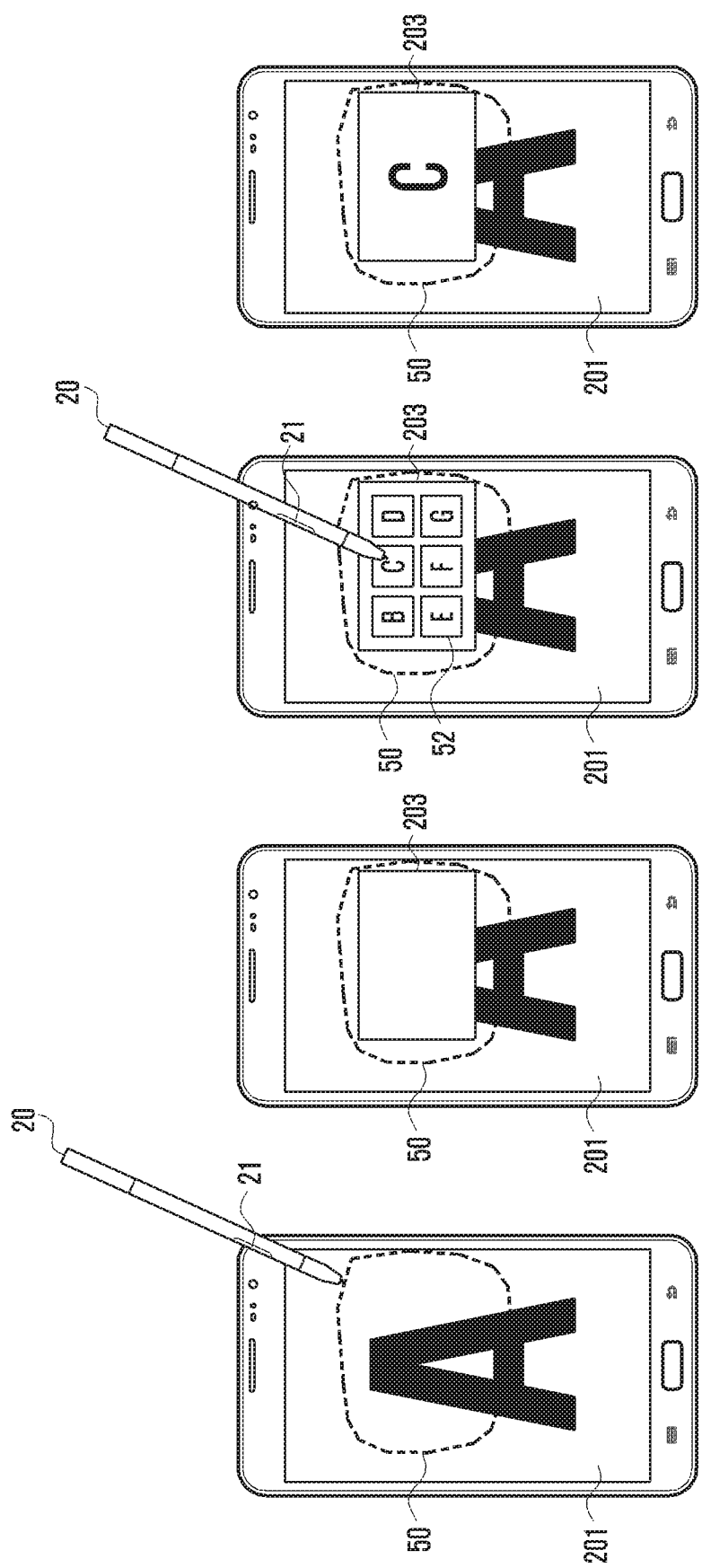
FIGS. 4A, 4B, 4C, and 4D illustrate examples of displaying a second window according to various embodiments of the present disclosure.

Referring to FIG. 4A, the controller 140 may obtain a generation request input in the first window 201. For example, the controller 140 may obtain an input (for example, generation request input) in the form of closed curve on the first window 201. For example, the controller 140 may obtain an input 50 of drawing a closed curve while pressing a button of the electronic pen 20 (for example, in a window generation mode). Further, the controller 140 may obtain a finger input of the user of drawing a closed curve in a state where the input mode has been changed to the window generation mode. Referring to FIG. 4B, the controller 140 may generate the second window 203 inscribed or circumscribed in an area corresponding to the input 50. In another embodiment, the second window 203 matching the area corresponding to the input may be generated. Referring to FIG. 4C, the controller 140 may display an application list 52 related to the second window 203 on the second window 203. The application list 52 may include an application icon configured by the user, an application icon which can be used in the second window and the like. In any embodiment, the application list may be expressed in various ways, such as an icon, a text list and the like. The controller 140 may obtain an input of selecting at least one application from the application list. Referring to FIG. 4D, the selected application may be provided to the second window 203.

According to an embodiment, the controller 140 may provide the application or a function thereof according to different attributes based on a size of the generated second window. For example, when the size of the second window 203 is a first size (for example, the size is larger than ¼ of an entire size of the touch screen 130), the controller 140 may provide the application according to a first attribute (for example, in the form of music player application). Alternatively, when the size of the second window 203 is a second size (for example, the size is equal to or smaller than ¼ of an entire size of the touch screen 130), the controller 140 may provide the application according to a second attribute (for example, in the form of music player widget).

Figures 5A, 5B, 5C:
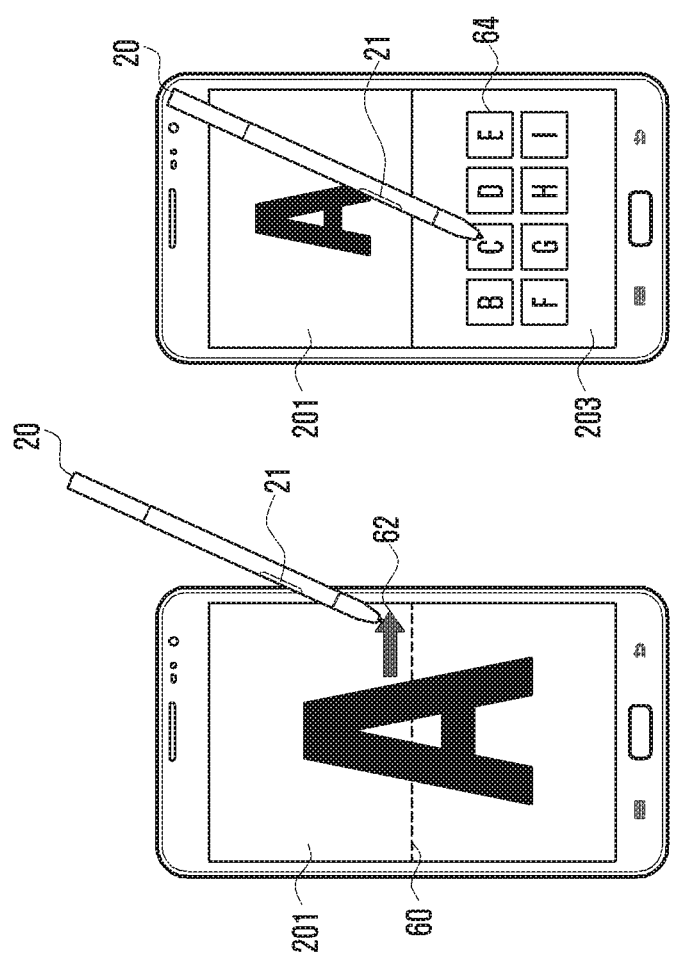
FIGS. 5A, 5B, and 5C illustrate examples of splitting a screen and displaying a second window according to various embodiments of the present disclosure.

FIGS. 5A, 5B, and 5C illustrate examples of splitting a screen and displaying a second window according to various embodiments of the present disclosure.

Referring to FIG. 5A, the controller 140 may obtain a generation request input in an area of the first window 201. For example, the controller may obtain an input of crossing at least a part (for example, the first window 201) of the touch screen 130 in a horizontal direction 62 in the window generation mode (for example, while pressing the button 21 of the electronic pen 20). The controller 140 may split the area corresponding to the first window 201 into upper and lower areas (for example, a first area and a second area) based on a position where the generation request input is obtained or the line 60 drawn by the generation request input in the area of the first window 201. The controller 140 may display the first window in at least one (for example, the first area) of the upper and lower areas and display the second window in the other area (for example, the second area).

Referring to FIG. 5B, the controller 140 may display an application list 64 related to the second window 203. The controller 140 may obtain an input of selecting at least one application from the application list 64. Referring to FIG. 5C, the selected application may be provided to the second window 203. According to an embodiment, the controller 14 may provide the application list through the first window, a separate window (for example, a popup window) or a menu.

FIGS. 6A, 6B, and 6C illustrate examples of re-splitting a screen in a state where the screen has been split and displaying a third window according to various embodiments of the present disclosure.

Referring to FIG. 6A, in a state where the first window 201 and the second window 203 are displayed, the controller 140 may obtain a generation request input in the area of the first window 201. For example, the controller 140 may obtain an input of crossing at least a part (for example, the first window 201) of the touch screen 130 in a vertical direction in the window generation mode. The controller 140 may split the area corresponding to the first window 201 into left and right areas (for example, a third area and a fourth area) based on a position where the generation request input is generated or a line 70 drawn by the generation request input in the first window 201. The controller 140 may display the first window in at least one (for example, the third area) of the left and right areas and display the second window in the other area (for example, the fourth area).

Referring to FIG. 6B, the controller 140 may display an application list 72 (for example, a list of executable applications) related to the third window 205. The controller 140 may obtain a user input of selecting at least one application from the application list 72. Referring to FIG. 6C, the controller 140 may provide the selected application to the third window 205.

FIGS. 7A, 7B, 7C, and 7D illustrate examples of re-splitting a screen in a state where the screen is split and displaying an additional window according to various embodiments of the present disclosure.

Referring to FIG. 7A, in a state where the first window 201 and the second window 203 are displayed, the controller 140 may obtain a generation request input in the area of the first window 201 and the area of the second window 203. For example, the controller 140 may obtain an input (for example, a drag input) of crossing at least a part (for example, the first window 201 and the second window 203) of the touch screen in a vertical direction in the window generation mode (for example, in switching through a selection of a menu button). The controller 140 may split each of the areas corresponding to the first window 201 and the second window 203 into left and right areas (for example, a third area, a fourth area, a fifth area, and a sixth area) based on a position where the generation request input is generated or a line 80 drawn by the generation request input in the areas of the first window 201 and the second window 203. The controller 140 may display the first window 201 in at least one (for example, the third area) of the left and right areas split from the first window 201 and display the third window 205 in the other area (for example, the fourth area). Further, the controller 140 may display the second window 203 in at least one (for example, the fifth area) of the left and right areas split from the second window 203 and display the fourth window 207 in the other area (for example, the sixth area).

Referring to FIG. 7B, the controller 140 may display an application list 82 related to at least one or each of the third window 205 and the fourth window 207. The controller 140 may obtain an input of selecting at least one application from the application list 82. Referring to FIG. 7C, the controller 140 may provide an application selected from the third window 205 to the third window 205. Referring to FIG. 7D, the controller 140 may provide an application selected from the fourth window 207 to the fourth window 207.

Figure 8:
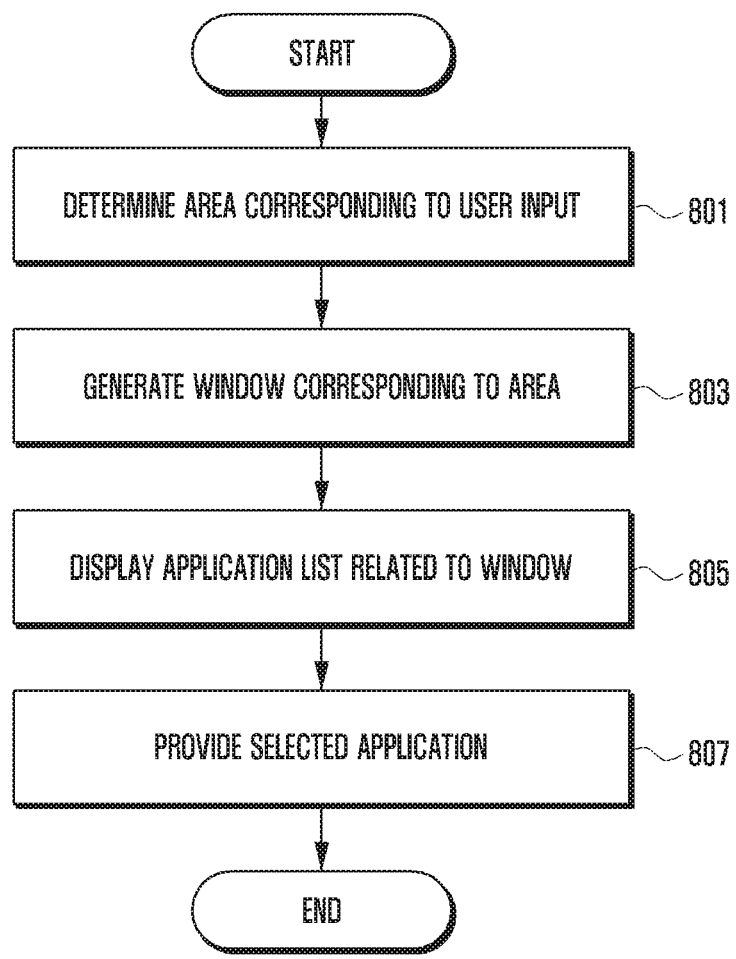
FIG. 8 is a flowchart illustrating a method of displaying a window according to various embodiments of the present disclosure.

FIG. 8 is a flowchart illustrating a method of displaying a window according to various embodiments of the present disclosure.

Referring to FIG. 8, the electronic device may determine at least a partial area of a UI corresponding to an input in operation 801. According to an embodiment, the electronic device may determine an area corresponding to an input obtained in an area of the first window. For example, when the input draws a closed curve, an area inscribed or circumscribed in the closed curve may be determined as at least the partial area. In any embodiment, when the input draws a line (for example, a curve) of one or more strokes, an area circumscribed in the line of one or more strokes may be determined as at least the partial area. In any embodiment, when the input draws a line of one or more strokes, an area corresponding to a quadrangle, which includes a start point and an end point of the line of one or more strokes as vertexes facing each other, may be determined as at least the partial area. In any embodiment, when the input draws a line crossing at least a part of the UI, an area corresponding to the UI may be split into a first area and a second area based on the line and at least one of the first area and the second area may be determined as at least the partial area.

In operation 803, the electronic device may generate a window based on at least the partial area. In any embodiment, when a size of at least the partial area is smaller than a predetermined size, a window having the predetermined size may be generated. In any embodiment, when a length of at least one side of at least the partial area is smaller than a predetermined length, a window may be generated such that each side of at least the partial area is longer than or equal to the predetermined length.

In operation 805, the electronic device may display an application list related to the window. According to an embodiment, an executable application list may be displayed on the window. In any embodiment, the list may include at least one of an application configured by the user and an application which can be used in the window. In any embodiment, only an application which can be executed in the size of the window may be displayed.

In operation 807, based on an input of selecting at least one application from the list, the electronic device may provide the selected application through the window. According to an embodiment, the electronic device may provide the application or a function thereof according to different attributes based on a size of the generated second window.

According to various embodiments, at least part of a device (for example, modules or functions thereof) or a method (for example, operations) according to the various embodiments of the present disclosure may be embodied by, for example, one or more instructions stored in a non-transitory computer readable storage medium provided in a form of a programming module. When the command is executed by one or more processors (for example, controller 140), the one or more processors may perform a function corresponding to the command. The non-transitory computer readable storage medium may be, for example, the storage unit 120. At least a part of the programming module may be implemented (for example, executed) by, for example, the controller 140. At least a part of the programming module may include, for example, a module, a program, a routine, a set of instructions and/or a process for performing one or more functions.

The non-transitory computer readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as a Read Only Memory (ROM), a Random Access Memory (RAM), a flash memory and the like.

Further, the program commands may include high class language codes that can be executed in a computer by using an interpreter, as well as machine language codes that are made by a compiler. The aforementioned hardware device may be configured to operate as one or more software modules in order to perform the operation of the present disclosure, and vice versa. A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
    displaying, at a display of a mobile communication device, a first execution screen of a first application in a full screen;
    receiving, by the mobile communication device, a first input dividing the first execution screen into a first area and a second area, the first input comprising a line drawn across the first execution screen, and the first area being larger or smaller than the second area;
    splitting, by the mobile communication device, the display into a first window of a first predetermined size and a second window of a second predetermined size in response to the first input;
    displaying, at the display, at least a part of the first execution screen on the first window when the display is split into the first window and the second window;
    displaying, at the display, an application list on the second window when the display is split into the first window and the second window;
    receiving, by the mobile communication device, a second input for selecting an application from the application list;
    displaying, at the display, a second execution screen related to the selected application on the second window in response to the second input; and
    distinguishing a type of input tool between the first input and the second input.

2. The method of claim 1, wherein the displaying the application list comprises displaying at least one application icon.

3. The method of claim 2, wherein the at least one application icon is configured by a user.

4. The method of claim 1, wherein the application list is configured by a user.

5. The method of claim 1, further comprising:
    displaying, at the display, a dividing line separating the first area and the second area based on the first input.

6. The method of claim 1, wherein each of the first input and the second input comprises one of a touch input that is generated by a user's finger or a touch input that is generated by an electronic pen.

7. The method of claim 1, wherein the first execution screen comprises at least one of a home window or an application window corresponding to an application selected by a user.

8. A mobile communication device comprising:
    a display; and
    at least one processor configured to:
        control the display to display a first execution screen of a first application in a full screen,
        receive a first input dividing the first execution screen into a first area and a second area, the first input comprising a line drawn across the first execution screen, and the first area being larger or smaller than the second area,
        split the display into a first window of a first predetermined size and a second window of a second predetermined size in response to the first input,
        control the display to display at least a part of the first execution screen on the first window when the display is split into the first window and the second window,
        control the display to display an application list on the second window when the display is split into the first window and the second window,
        receive a second input for selecting an application from the application list,
        control the display to display a second execution screen related to the selected application on the second window in response to the second input, and
        distinguish a type of input tool between the first input and the second input.

9. The mobile communication device of claim 8, wherein the application list comprises at least one application icon.

10. The mobile communication device of claim 9, wherein the at least one application icon is configured by a user.

11. The mobile communication device of claim 8, wherein the application list is configured by a user.

12. The mobile communication device of claim 8, wherein the at least one processor is further configured to control the display to display a dividing line separating the first area and the second area based on the first input.

13. The mobile communication device of claim 8, wherein each of the first input and the second input comprises one of a touch input that is generated by a user's finger or a touch input that is generated by an electronic pen.

14. The mobile communication device of claim 8, wherein the first execution screen comprises at least one of a home window or an application window corresponding to an application selected by a user.

15. The method of claim 1,
    wherein the mobile communication device stores a plurality of applications,
    wherein the plurality of application comprises applications that can be used in a multi-screen environment and applications that cannot be used in the multi-screen environment, and
    wherein the application list only includes applications that can be used in the multi-screen environment.

16. The mobile communication device of claim 8, further comprising a memory configured to store a plurality of applications,
   wherein the plurality of application comprises applications that can be used in a multi-screen environment and applications that cannot be used in the multi-screen environment, and
   wherein the application list only includes applications that can be used in the multi-screen environment.

17. A mobile communication device comprising:
   a display; and
   at least one processor configured to:
      control the display to display a first execution screen of a first application in a display area of the display in a full screen mode,
      receive a first input of a first type dividing the first execution screen into a first area and a second area, the first input comprising a line drawn across the first execution screen, and the first area being larger or smaller than the second area,
      split the display area of the display into a first window of a first predetermined size and a second window of a second predetermined size based on the first input,
      control the display to display at least part of the first execution screen in the first window when the display area is split into the first window and the second window,
      identify one or more applications executable in a multi-window mode from a plurality of applications installed in the mobile communication device,
      control the display to display an application list including only the identified one or more applications in the second window when the display area is split into the first window and the second window,
      receive a second input of a second type, different from the first type, for selecting an application from the application list,
      control the display to display a second execution screen related to the selected application in the second window based on the second input while the at least part of the first execution screen is displayed in the first window, and
      distinguish a type of input tool between the first input and the second input.

18. A method comprising:
   controlling a display to display a first execution screen of a first application in a display area of the display in a full screen mode;
   receiving a first input of a first type dividing the first execution screen into a first area and a second area, the first input comprising a line drawn across the first execution screen, and the first area being larger or smaller than the second area;
   splitting the display area of the display into a first window of a first predetermined size and a second window of a second predetermined size based on the first input;
   controlling the display to display at least part of the first execution screen in the first window when the display area is split into the first window and the second window;
   identifying one or more applications executable in a multi-window mode from a plurality of applications installed in a mobile communication device;
   controlling the display to display an application list including only the identified one or more applications in the second window when the display area is split into the first window and the second window;
   receiving a second input of a second type, different from the first type, for selecting an application from the application list;
   controlling the display to display a second execution screen related to the selected application in the second window based on the second input while the at least part of the first execution screen is displayed in the first window; and
   distinguishing a type of input tool between the first input and the second input.

* * * * *